United States Patent
Shirai et al.

(10) Patent No.: US 9,701,779 B2
(45) Date of Patent: Jul. 11, 2017

(54) POLYURETHANE

(71) Applicant: NIPPON SODA CO., LTD., Tokyo (JP)

(72) Inventors: Akihiro Shirai, Tokyo (JP); Yasunori Miyashita, Joetsu (JP); Shinichi Kimizuka, Ichihara (JP); Mitsuhiro Nakamura, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 7 days.

(21) Appl. No.: 14/397,552

(22) PCT Filed: May 23, 2013

(86) PCT No.: PCT/JP2013/064355
§ 371 (c)(1),
(2) Date: Oct. 28, 2014

(87) PCT Pub. No.: WO2013/180006
PCT Pub. Date: Dec. 5, 2013

(65) Prior Publication Data
US 2015/0119535 A1 Apr. 30, 2015

(30) Foreign Application Priority Data

May 30, 2012 (JP) ................................. 2012-122744

(51) Int. Cl.
*C08G 18/66* (2006.01)
*C08G 18/42* (2006.01)
*C08G 18/10* (2006.01)
*C08G 18/76* (2006.01)
*C08G 18/69* (2006.01)

(52) U.S. Cl.
CPC ......... *C08G 18/4277* (2013.01); *C08G 18/10* (2013.01); *C08G 18/4275* (2013.01); *C08G 18/664* (2013.01); *C08G 18/69* (2013.01); *C08G 18/694* (2013.01); *C08G 18/7621* (2013.01)

(58) Field of Classification Search
CPC ............... C08G 18/664; C08G 18/694; C08G 18/4269; C08G 18/4272; C08G 18/4275; C08G 18/4277
USPC ........................................................ 525/454
See application file for complete search history.

(56) References Cited

U.S. PATENT DOCUMENTS

| 3,686,158 A * | 8/1972 | Bouton ................... C08F 36/04 526/173 |
| RE28,047 E * | 6/1974 | Bouton ................... C08F 36/04 526/181 |
| 4,898,965 A * | 2/1990 | Kinoshita .......... C08G 18/4277 558/302 |
| 5,707,743 A * | 1/1998 | Janes .................... B29C 39/003 428/423.1 |
| 6,593,423 B1 * | 7/2003 | Kondos .................... C08J 7/047 525/191 |
| 7,976,951 B2 * | 7/2011 | Griswold ............... C08G 18/10 428/423.1 |
| 2004/0162385 A1 | 8/2004 | Krebs |
| 2005/0154149 A1 * | 7/2005 | Beach ................... C08G 18/10 525/453 |

FOREIGN PATENT DOCUMENTS

| EP | 0266973 A2 | 5/1988 |
| JP | A-55-152720 | 11/1980 |
| JP | A-60-023418 | 2/1985 |
| JP | A-07-082337 | 3/1995 |
| JP | A-2005-133030 | 5/2005 |
| JP | 2008106188 A * | 5/2008 |
| JP | A-2008-539305 | 11/2008 |
| JP | A-2011-046912 | 3/2011 |
| WO | WO 2006/118766 A1 | 11/2006 |
| WO | WO 2010/064612 A1 | 6/2010 |

OTHER PUBLICATIONS

Cray Valley. Resins par excellence. Product Bulletin. Hydroxyl Terminated Polybutadiene Resins and Derivatives—Poly bd and Krasol. Available at http://www.crayvalley.com/docs/technical-paper/hydroxyl-terminated-polybutadiene-resins-and-derivatives.pdf. Evidentiary reference.*
Machine Translation of JP 2008-106188.*
Sep. 16, 2013 Taiwanese Office Action issued in Taiwanese Application No. 102117977 (with translation).
Sep. 25, 2015 Extended European Search Report issued in Patent Application No. 13797500.9.
Sep. 12, 2014 Taiwanese Office Action issued in Taiwanese Application No. 102117977 (with translation).
Sep. 3, 2013 International Search Report issued in International Application No. PCT/JP2013/064355 (with translation).

* cited by examiner

*Primary Examiner* — Mike M Dollinger
(74) *Attorney, Agent, or Firm* — Oliff PLC

(57) ABSTRACT

A polybutadiene having a hydroxyl group at a terminal end thereof is reacted with a lactone compound such as an ε-caprolactone to obtain a polymer polyol represented by formula (I): HO—$X^1$—Y—$X^2$—OH (wherein $X^1$ and $X^2$ each independently represents a polyester component and Y represents a polybutadiene component), the polymer polyol is reacted with an unsymmetric diisocyanate to obtain a urethane prepolymer, and then the urethane prepolymer is reacted with a chain extender to obtain a polyurethane.

3 Claims, No Drawings

POLYURETHANE

TECHNICAL FIELD

The present invention relates to a polyurethane. In particular, the present invention relates to a polyurethane having favorable mechanical and physical properties and excellent water-resistant properties.

The present invention claims priority on the basis of Japanese Patent Application No. 2012-122744 filed in Japan on May 30, 2012, the contents of which are incorporated herein by reference.

BACKGROUND OF THE INVENTION

A thermoplastic polyurethane (hereinafter, which may be abbreviated as TPU) is used in various fields, such as various elastomer molded products, synthetic leathers, artificial leathers, adhesive agents, shoe soles, spandexes, or the like. The TPU is prepared by reacting a polyol with an organic polyisocyanate, and a chain extender as needed (Patent Document 3, Patent Document 4, or the like). TPUs having various characteristics can be obtained by changing kinds of a polyol and an organic diisocyanate to be used as raw materials.

Patent Document 1 discloses a transparent hardened sheet obtained by reacting a diphenylmethane diisocyanate with a block copolymer composed of a block formed by a hydrocarbon-based polymer, the main chain of which being approximately saturated and a block formed by conducting ring-opening polymerization of an ε-caprolactone. Patent Document 2 discloses a lactone polymer obtained by conducting ring-opening polymerization of lactones using a polybutadiene polyol as an initiator. Patent Document 2 discloses that the lactone polymer may be used in a thermoplastic urethane elastomer, a thermosetting urethane elastomer, a urethane foam, an adhesive agent, a sealant, a paint, or the like.

DOCUMENTS OF RELATED ART

Patent Documents

Patent Document 1: Japanese Unexamined Patent Application, First Publication No. S55-152720
Patent Document 2: Japanese Unexamined Patent Application, First Publication No. S60-23418
Patent Document 3: Japanese Patent Application Laid-Open No. 2005-133030
Patent Document 4: Japanese Patent Application Laid-Open No. 2011-46912

SUMMARY OF THE INVENTION

Problems to be Solved by the Invention

An object of the present invention is to provide a polyurethane having favorable mechanical and physical properties and excellent water-resistant properties.

Means to Solve the Problems

The present invention includes the following aspects.
<1> A polyurethane obtained by reacting a polymer polyol represented by formula (I), an unsymmetric diisocyanate, and a chain extender.

$$HO-X^1-Y-X^2-OH \quad (I)$$

In the formula (I), $X^1$ and $X^2$ each independently represents a polyester component and Y represents a polybutadiene component.
<2> The polyurethane described in the item <1>, wherein the polyester component is a component having at least one repeating unit represented by formula (II).

In the formula (II), $R^1$ and $R^2$ each independently represents a hydrogen atom or an alkyl group, and n represents a repeat number of a unit in parentheses and any one integer of 3 to 7.
<3> The polyurethane described in the item <1> or <2>, wherein the polymer polyol is a polymer obtained by reacting a polybutadiene having a hydroxyl group at a terminal end thereof with a lactone compound represented by formula (III).

In the formula (III), $R^1$ and $R^2$ each independently represents a hydrogen atom or an alkyl group, and n represents a repeat number of a unit in parentheses and any one integer of 3 to 7.
<4> The polyurethane described in the item <1>, wherein the polybutadiene component has a molar ratio of a 1,2-structure/a 1,4-structure within a range from 55/45 to 95/5.
<5> The polyurethane described in any one item of <1> to <4>, wherein the chain extender is an aliphatic glycol.

Effects of the Invention

The polyurethane according to the present invention has favorable mechanical and physical properties and excellent water-resistant properties.

EMBODIMENTS FOR CARRYING OUT THE INVENTION

The inventors of the present invention undertook intensive investigation to achieve the object described above, and thereby discovered that a polyurethane having favorable mechanical and physical properties and excellent water-resistant properties is obtained by reacting a polymer polyol having a particular block structure, an unsymmetric diisocyanate, and a chain extender. The present invention was completed by undertaking further investigation on the basis of the discovery.

A polyurethane according to the present invention is obtained by reacting a polymer polyol, an unsymmetric diisocyanate, and a chain extender.

(Polymer Polyol)

A polymer polyol to be used according to the present invention is a polymer polyol represented by formula (I).

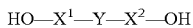
HO—X$^1$—Y—X$^2$—OH  (I)

In the formula (I), $X^1$ and $X^2$ represent polyester components, and Y represents a polybutadiene component. $X^1$ and $X^2$ may be polyester components having the same structure or polyester components having different structures from each other.

The polybutadiene component is a polymer component composed of repeating units derived from butadienes. Examples of the repeating units derived from butadienes include: a repeating unit represented by formula (IVa) or (IVb) (which, hereinafter, may be abbreviated as 1,4-structure); and a repeating unit represented by formula (Va) or (Vb) (which, hereinafter, may be abbreviated as 1,2-structure). It is preferable that the polybutadiene component include both the 1,4-structure and the 1,2-structure.

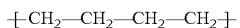
—[—CH$_2$—CH$_2$—CH$_2$—CH$_2$—]—  (IVa)

—[—CH$_2$—CH═CH—CH$_2$—]—  (IVb)

A double bond in the formula (IVb) encompasses a trans bond or a cis bond.

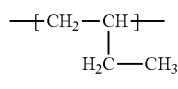
(Va)

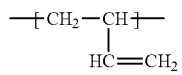
(Vb)

The molar ratio of the 1,2-structure/the 1,4-structure in the polybutadiene component is preferably 55/45 to 95/5, and more preferably 70/30 to 95/5. The polyurethane tends to be colored in accordance with the decrease in the content of the 1,2-structure. The molar ratio of the 1,2-structure/the 1,4-structure may be calculated after measuring $^1$H-NMR, for example. The molar ratio of the 1,2-structure/the 1,4-structure may be adjusted using a well-known method. For example, the molar ratio of the 1,2-structure/the 1,4-structure may be controlled by selecting the kind of a catalyst or a subsidiary polymerization agent to be used to polymerize butadienes. The number average molecular weight (Mn) of the polybutadiene component is preferably 500 to 10000, and more preferably 1000 to 7000. The number average molecular weight (Mn) is determined by measuring gel permeation chromatography (GPC) using a polystyrene as a standard material. The measurement condition therefor is as follows: THF (tetrahydrofuran) is used as a mobile phase, the flow rate of the mobile phase is set at 1 mL/minute, the column temperature is set at 40° C., the sample injection volume is set at 40 µL, and the sample concentration is adjusted to 2% by weight.

There is no particular limitation on the polyester component, provided that the repeating units therein are linked via ester bonds. In the present invention, the polyester component is preferably a component having at least one repeating unit represented by formula (II).

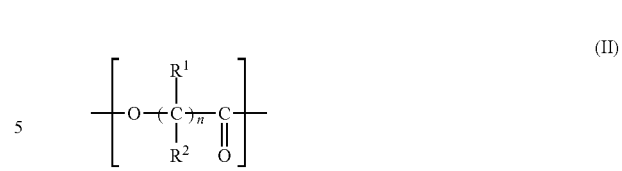
(II)

In the formula (II), $R^1$ and $R^2$ each independently represents a hydrogen atom or an alkyl group, preferably represents a hydrogen atom. n represents a repeat number of a unit in parentheses and any one integer of 3 to 7, preferably 5.

The alkyl group in $R^1$ and $R^2$ preferably has 1 to 6 carbon atoms, more preferably 1 to 4 carbon atoms, and even more preferably 1 or 2 carbon atoms. Examples of the alkyl group include a methyl group, an ethyl group, an n-propyl group, an i-propyl group, an n-butyl group, an i-butyl group, a t-butyl group, an n-pentyl group, an n-hexyl group, and the like. Among these, a methyl group or an ethyl group is preferable.

The polyester component may be formed by linking repeating units having the same structure or linking repeating units having different structures from each other.

The mass ratio of $X^1$ to $X^2$ in the polymer polyol represented by the formula (I) is preferably 1/99 to 99/1.

The ratio of the mass of Y, with reference to the total mass of $X^1$ to $X^2$, in the polymer polyol represented by the formula (I) is preferably 0.1 to 10, more preferably 0.2 to 5, and even more preferably 0.3 to 3.5. The ratio of the mass of Y, with reference to the total mass of $X^1$ to $X^2$, may be, for example, adjusted by changing the mass ratio of a polybutadiene having a hydroxyl group at a terminal end thereof to a lactone compound, to be reacted. The ratio of the mass of Y, with reference to the total mass of $X^1$ to $X^2$, may be, for example, calculated after measuring $^1$H-NMR or the like.

The structure of a binding portion between $X^1$ and Y or $X^2$ and Y is not particularly limited, and may be arbitrarily selected provided that effects of the present invention are not deteriorated.

The polymer polyol represented by the formula (I) is not particularly limited by the production method thereof. In the present invention, the polymer polyol is preferably prepared by reacting a polybutadiene having a hydroxyl group at a terminal end thereof with a lactone compound.

As the polybutadiene having a hydroxyl group at a terminal end thereof, commercially available ones may be used. Examples thereof include NISSO-PB-G-1000 (manufactured by Nippon Soda Co., Ltd.), NISSO-PB-G-2000 (manufactured by Nippon Soda Co., Ltd.), NISSO-PB-G-3000 (manufactured by Nippon Soda Co., Ltd.), NISSO-PB-GI-1000 (manufactured by Nippon Soda Co., Ltd.), NISSO-PB-GI-2000 (manufactured by Nippon Soda Co., Ltd.), NISSO-PB-GI-3000 (manufactured by Nippon Soda Co., Ltd.), POLY BD R45HT (manufactured by Idemitsu Kosan Co., Ltd.), and the like. One of these may be solely used, or at least two thereof may be used in combination.

Examples of the lactone compound include: 3-membered ring lactones such as an α-acetolactone, 4-membered ring lactones such as a β-propiolactone; 5-membered ring lactones such as a γ-butyrolactone and a γ-laurolactone; 6-membered ring lactones such as an δ-valerolactone; 7-membered ring lactones such as an ε-caprolactone; and 9-membered ring lactones such as a η-caprylolactone. One of these may be solely used, or at least two thereof may be used in combination. Among these, a compound represented by formula (III) is preferable, a 7-membered ring lactone is more preferable, and an ε-caprolactone is the most preferable.

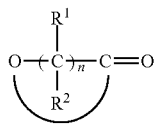

In the formula (III), $R^1$ and $R^2$ each independently represents a hydrogen atom or an alkyl group, and more preferably represents a hydrogen atom. n represents a repeat number of a unit in parentheses and any one integer of 3 to 7, and preferably represents 5.

A catalyst may be used when the polybutadiene having a hydroxyl group at a terminal end thereof is reacted with the lactone compound.

There is no particular limitation on the catalyst, and examples thereof include: organotitanium compounds, such as a tetrabutyl titanate, a tetraisopropyl titanate, and a tetraethyl titanate; organotin compounds, such as a dibutyltin oxide, a dibutyltin laurate, a tin 2-ethylhexanoate (II), a stannous octanoate, and mono-n-butyltin-fatty acid salts; and stannous halides, such as a stannous chloride, a stannous bromide, and a stannous iodide. An amount of the catalyst to be used is 0.05% by weight to 2% by weight, with reference to the total weight of the polybutadiene and the lactone compound. The amount of the catalyst to be used is preferably 0.01% by mole to 2% by mole, more preferably 0.02% by mole to 1.2% by mole, with reference to the amount of hydroxyl groups contained in reaction raw materials.

Although the polybutadiene and the lactone compound may be reacted by raising the temperature of reaction raw materials until the viscosity thereof allows the reaction raw materials to be sufficiently stirred, it is preferable that the temperature be raised so that vaporization of the reaction raw materials or decomposition of a catalyst is prevented. The specific temperature at the reaction is preferably 50° C. to 200° C., and more preferably 80° C. to 150° C. The reaction time may be suitably selected depending on the reaction scale, the reaction temperature, the kind or the mass ratio of the polybutadiene and the lactone compound, the kind or the used amount of the catalyst, or the like.

The reaction may be conducted in a continuous flow manner or a batch manner. The method for putting the polybutadiene having a hydroxyl group at a terminal end thereof and the lactone compound into a reactor is not particularly limited. For example, the polybutadiene and the lactone compound may be mixed and then put into a reactor all at once, continuously, or discontinuously; or the polybutadiene and the lactone compound may be separately put into a reactor all at once, continuously, or discontinuously. In the case where multiple kinds of the lactone compounds were used, one kind of the lactone compounds may be put into a reactor all at once, followed by adding other kinds of the lactone compounds thereto continuously or discontinuously.

The polymer polyol to be used in the present invention preferably has a hydroxyl value of 20 to 350 mg KOH/g, and more preferably 20 to 200 mg KOH/g. In the case where the hydroxyl value is within the above-mentioned range, a polyurethane well balanced between the mechanical strength and the water-resistant properties can be obtained. The number average molecular weight (Mn) of the polymer polyol to be used in the present invention is within a range of 1000 to 100000, more preferably within a range of 3000 to 30000, and even more preferably within a range of 5000 to 15000. The molecular weight distribution (Mw/Mn) thereof is preferably within a range of 1.01 to 5, and more preferably within a range of 1.1 to 2.2. The number average molecular weight (Mn) and the weight-average molecular weight (Mw) are determined by measuring gel permeation chromatography (GPC) using a polystyrene as a standard material.

(Unsymmetric Diisocyanate)

An unsymmetric diisocyanate to be used in the present invention is an organic compound having two isocyanate groups per molecule. The two isocyanate groups in the unsymmetric diisocyanate react with OH groups in different manners due to differences in terms of stereoscopic and electronic environments thereof, the differences being caused by unsymmetricity of the compound. The use of the unsymmetric diisocyanate makes it possible to obtain a polyurethane having favorable mechanical and physical properties and excellent water-resistant properties.

Examples of the unsymmetric diisocyanate include: aromatic unsymmetric diisocyanates, such as a 2,4-tolylenediisocyanate, a naphthalene-1,4-diisocyanate, and a diphenylmethane-2,4'-diisocyanate; alicyclic unsymmetric diisocyanates, such as a 1-isocyanatomethyl-3-isocyanato-1,5,5-trimethyl-cyclohexane (isophorone diisocyanate), a 1-methyl-2,4-diisocyanato-cyclohexane, and hydrogenated product of the above-mentioned aromatic diisocyanates; and aliphatic unsymmetric diisocyanates, such as a 1,6-diisocyanato-2,2,4-trimethylhexane, a 1,6-diisocyanato-2,4,4-trimethylhexane, and a lysinediisocyanate. The 2,4-tolylenediisocyanate and/or the isophorone diisocyanate are particularly preferably used. One of these may be solely used or at least two thereof may be used in combination. The present invention encompasses an aspect in which the unsymmetric diisocyanate is used with unsymmetric diisocyanate.

Among these, the aromatic unsymmetric diisocyanates and the alicyclic unsymmetric diisocyanates are preferable in terms that the time period (usable time or pot life), in which a fluidity that allows molding is maintained after preparing a urethane prepolymer and then adding a chain extender thereto, is suitable length for practical use, therefore the handling ability is excellent, and the mechanical strength of the resultant polyurethane is excellent.

An amount of the unsymmetric diisocyanate to be used in the reaction is determined so that an R ratio is preferably within a range of 1 to 10, more preferably 2 to 5, and even more preferably 2.1 to 3.8. The R ratio is a molar ratio of a mole number of isocyante groups derived from the unsymmetric diisocyanate to a mole number of hydroxyl groups derived from the polymer polyol.

(Chain Extender)

The chain extender to be used in the present invention is mainly a low-molecular polyol or a low-molecular polyamine, and preferably a low-molecular polyol.

Examples of the low-molecular polyol include: aliphatic glycols, such as, an ethylene glycol, a diethylene glycol, a triethylene glycol, a propylene glycol, a dipropylene glycol, a tripropylene glycol, a 1,3-propanediol, a 2-methyl-1,3-propanediol, a 2-methyl-2-propyl-1,3-propanediol, a 2-butyl-2-ethyl-1,3-propanediol, a 2-butyl-2-hexyl-1,3-propanediol, a 1,2-butanediol, 1,3-butanediol, a 1,4-butanediol, a 2,3-butanediol, a 1,5-pentanediol, a 2-methyl-2,4-pentanediol, a 3-methyl-1,5-pentanediol, a 2,2,4-trimethyl-1,3-pentanediol, a neopentyl glycol, a 1,6-hexanediol, 2-ethyl- 1,3-hexanediol, a 2,5-dimethyl-2,5-hexanediol, a 1,8-octanediol, a 2-methyl-1,8-octanediol, and a 1,9-nonanediol; alicyclic glycols, such as a bishydroxymethylcyclohexane; aromatic glycols, such as, a xylylene glycol, and a bishydroxyethoxybenzene, and the like. Among these, the aliphatic glycols or the alicyclic glycols are preferable, the aliphatic glycols are more preferable, the aliphatic glycols having 2 to 5 carbon atoms are even more preferable, and the butanediols are particularly preferable, in terms that a polyurethane excellent in mechanical strength, water-resistant properties, and handling ability, can be obtained.

Examples of the low-molecular polyamine include: aromatic diamines, such as, a 2,4-tolylenediamine, a 2,6-tolylenediamine, a xylylenediamine, and a 4,4'-diphenylmethane diamine; aliphatic diamines, such as, an ethylenediamine, a 1,2-propylenediamine, a 2,2-dimethyl-1,3-propanediamine, a 1,3-pentanediamine, a 2-methyl-1,5-pentanediamine, a 2-butyl-2-ethyl-1,5-pentanediamine, a 1,6-hexanediamine, a 2,2,4- or 2,4,4-trimethylhexanediamine, a 1,8-octanediamine, a 1,9-nonanediamine, and a 1,10-decanediamine; alicyclic diamines, such as, a 1-amino-3-aminomethyl-3,5,5-trimethylcyclohexane, a 4,4'-dicyclohexylmethanediamine, an isopropylidenecyclohexyl-4,4'-diamine, a 1,4-diaminocyclohexane, and a 1,3-bisaminomethylcyclohexane, and the like. Among these, the ethylenediamines, the propylenediamines, the 1,3-pentanediamine, and the 2-methyl-1,5-pentanediamine are preferable.

An amount of the chain extender to be used in the reaction is determined so that an NCO index is preferably within a range of 0.2 to 10, more preferably 0.5 to 1.25, and even more preferably 0.9 to 1.1. The NCO index is a molar ratio of a mole number of isocyante groups derived from the unsymmetric diisocyanate with reference to the total mole number of hydroxyl groups derived from the polymer polyol and hydroxyl groups derived from the chain extender.

Although there is no particular limitation on a production method of the polyurethane according to the present invention, and the polyurethane may be prepared using a prepolymer method or a one-shot method, the polyurethane is preferably prepared using the prepolymer method.

In the prepolymer method, a polymer polyol and an unsymmetric diisocyanate are reacted to obtain a urethane prepolymer having an isocyanate group at a terminal end thereof, and then a chain extender is reacted therewith to obtain a polyurethane. In the one-shot method, a polymer polyol, an unsymmetric diisocyanate, and a chain extender are reacted by almost-simultaneously adding them in a reactor to obtain a polyurethane.

The reaction may be conducted by raising the temperature of reaction raw materials until the viscosity thereof allows the reaction raw materials to be sufficiently stirred. The specific temperature, when the reaction is conducted, is preferably within a range from room temperature to 200° C., and more preferably 50 to 100° C. In the case where the temperature at the reaction is too low, the reaction tends to slowly proceed, and thereby the time period required for the preparation tends to be extended. In the case where the temperature at the reaction is too high, a side reaction tends to occur, or the usable time tends to shorten, and thereby a molding treatment tends to become difficult.

The reaction may be conducted without using any solvents or in a solvent. It is preferable that a solvent inactive in the reaction be used. Examples of the solvent include a toluene, an ethyl acetate, a butyl acetate, a methylethylketone, a dimethylformamide, a tetrahydrofuran, and the like.

A catalyst may be used to synthesize the polyurethane. Examples of the catalyst include: tertiary amines, such as, a dimethylethanolamine, a triethylenediamine, a tetramethylpropanediamine, a tetramethylhexamethylenediamine, and a dimethylcyclohexylamine; metallic catalysts, such as, a stannous octoate, a potassium octoate, and a dibutyltin dilaurate. An amount of the catalyst to be used is preferably 1 to 1000 ppm, and more preferably 5 to 800 ppm, with reference to the total amount of the polymer polyol, the unsymmetric diisocyanate, and the chain extender. When the amount of the catalyst to be used is too little, the reaction slowly proceeds, and the time period required for the preparation is elongated. When the amount of the catalyst to be used is too much, there is a case where heat generation is significant, the control of the reaction is difficult, and gel products are generated, or a colored polyurethane is generated.

Other additive agents may be suitably added to the polyurethane according to the present invention, provided that effects of the present invention are not deteriorated. Examples of the other additive agents include a flame retardant, a deterioration inhibitor, a plasticizer, and the like.

The present invention is described below in further detail using a series of examples. The present invention is in no way limited by these examples, and can, of course, be practiced with modification as appropriate within a range that can be adaptable to the purposes of the present invention, and those are all encompassed in the technical scope of the present invention.

(Preparation of Polymer Polyol)

SYNTHESIS EXAMPLE 1

300.5 g of polybutadiene having hydroxyethyl groups at both terminal ends thereof (NISSO-PB G-1000, manufactured by Nippon Soda Co., Ltd., molar ratio of 1, 2-structure/1,4-structure=90.4/9.6, number average molecular weight (Mn)=2500 (determined by GPC using a polystyrene as a standard material), hydroxyl value=72.9 (KOH mg/g) and 211.8 g of ε-caprolactone (manufactured by Wako Pure Chemical Industries, Ltd.) were put into a separable flask with a capacity of 1 L, and then heated at 60° C. to obtain an uniform solution under a nitrogen atmosphere. 1.8 g of tin 2-ethylhexanoate (II) (manufactured by Wako Pure Chemical Industries, Ltd.) was added thereto, heated at 100° C., and then stirred at 100° C. for 7 hours. Thereafter, the resultant was left to cool for 12 hours. The resultant was dissolved in 538.3 g of tetrahydrofuran. The obtained solution was added dropwise into 5331 g of methanol vigorously stirred. After the completion of the adding dropwise, the resultant was stirred for 2 hours, and then left still for 12 hours. The supernatant was decanted off, and the precipitate was dissolved in 508.6 g of tetrahydrofuran. The volatile component was distilled off under reduced pressure using an evaporator to obtain a polymer polyol A.

As a result of GPC measurement using a polystyrene as a standard material (measurement conditions of which were as follows: the mobile phase was THF, the flow rate of the mobile phase was 1 mL/minute, the column temperature was 40° C., the sample injection volume was 40 μL, and the sample concentration was 2% by weight), it was revealed that the polymer polyol A had a number average molecular weight (Mn) of 5900, a weight-average molecular weight (Mw) of 7600, and a molecular weight distribution (Mw/Mn) of 1.30. The $^1$H-NMR spectrum of the polymer polyol A was measured. The mass ratio of polybutadiene component/polycaprolactone component ($Y/(X^1+X^2)$) was 67.4/32.6.

SYNTHESIS EXAMPLE 2

200.0 g of polybutadiene having hydroxyethyl groups at both terminal ends thereof (NISSO-PB G-1000, manufactured by Nippon Soda Co., Ltd., molar ratio of 1, 2-structure/1,4-structure=90.4/9.6, number average molecular weight (Mn)=2500 (determined by GPC using a polystyrene as a standard material), hydroxyl value=72.9 (KOH mg/g) and 282.7 g of ε-caprolactone (manufactured by Wako Pure Chemical Industries, Ltd.) were put into a separable flask with a capacity of 1 L, and then heated at 60° C. to obtain an uniform solution under a nitrogen atmosphere. 1.2 g of tin 2-ethylhexanoate (II) (manufactured by Wako Pure Chemical Industries, Ltd.) was added thereto, heated at 100° C., and then stirred at 100° C. for 7 hours. Thereafter, the resultant was left to cool for 12 hours. The resultant was dissolved in 508.8 g of tetrahydrofuran. The obtained solution was added dropwise into 5244 g of methanol vigorously stirred. After the completion of the adding dropwise, the resultant was stirred for 2 hours, and then left still for 12 hours. The supernatant was decanted off, and the precipitate was dissolved in 587.8 g of tetrahydrofuran. The volatile component was distilled off under reduced pressure using an evaporator to obtain a polymer polyol B.

The polymer polyol B had a number average molecular weight (Mn) of 7600, a weight-average molecular weight (Mw) of 9400, and a molecular weight distribution (Mw/Mn) of 1.23, and the mass ratio of polybutadiene component/polycaprolactone component ($Y/(X^1+X^2)$) was 43.7/56.3.

SYNTHESIS EXAMPLE 3

100.1 g of polybutadiene having hydroxyethyl groups at both terminal ends thereof (NISSO-PB G-1000, manufactured by Nippon Soda Co., Ltd., molar ratio of 1, 2-structure/1,4-structure=90.4/9.6, number average molecular weight (Mn)=2500 (determined by GPC using a polystyrene as a standard material), hydroxyl value=72.9 (KOH mg/g) and 281.7 g of ε-caprolactone (manufactured by Wako Pure Chemical Industries, Ltd.) were put into a separable flask with a capacity of 1 L, and then heated at 60° C. to obtain an uniform solution under a nitrogen atmosphere. 0.6 g of tin 2-ethylhexanoate (II) (manufactured by Wako Pure Chemical Industries, Ltd.) was added thereto, heated at 100° C., and then stirred at 100° C. for 7 hours. Thereafter, the resultant was left to cool for 12 hours. The resultant was dissolved in 736.2 g of tetrahydrofuran. The obtained solution was added dropwise into 7095 g of methanol vigorously stirred. After the completion of the adding dropwise, the resultant was stirred for 2 hours, and then left still for 12 hours. The precipitate was collected by filteration, and dried under reduced pressure to obtain a polymer polyol C.

The polymer polyol C had a number average molecular weight (Mn) of 9900, a weight-average molecular weight (Mw) of 12200, and a molecular weight distribution (Mw/Mn) of 1.23, and the mass ratio of polybutadiene component/polycaprolactone component ($Y/(X^1+X^2)$) was 25.0/75.0.

SYNTHESIS EXAMPLE 4

250.0 g of polybutadiene having hydroxyethyl groups at both terminal ends thereof (NISSO-PB G-2000, manufactured by Nippon Soda Co., Ltd., molar ratio of 1, 2-structure/1,4-structure=90.5/9.5, number average molecular weight (Mn)=3600 (determined by GPC using a polystyrene as a standard material), hydroxyl value=52.6 (KOH mg/g) and 250.1 g of ε-caprolactone were put into a separable flask with a capacity of 1 L, and then heated at 60° C. to obtain an uniform solution under a nitrogen atmosphere. 1.0 g of tin 2-ethylhexanoate (II) was added thereto, heated at 100° C., and then stirred at 100° C. for 7 hours. Thereafter, the resultant was left to cool for 12 hours. The resultant was dissolved in 515.2 g of tetrahydrofuran. The obtained solution was added dropwise into 5062 g of methanol vigorously stirred. After the completion of the adding dropwise, the resultant was stirred for 2 hours, and then left still for 12 hours. The supernatant was decanted off, and the precipitate was dissolved in 515.6 g of tetrahydrofuran. The volatile component was distilled off under reduced pressure using an evaporator to obtain a polymer polyol D.

The polymer polyol D had a number average molecular weight (Mn) of 7400, a weight-average molecular weight (Mw) of 9500, and a molecular weight distribution (Mw/Mn) of 1.28, and the mass ratio of polybutadiene component/polycaprolactone component ($Y/(X^1+X^2)$) was 55.5/44.5.

SYNTHESIS EXAMPLE 5

250.0 g of polybutadiene having hydroxyethyl groups at both terminal ends thereof (POLY BD R-45HT, manufactured by Idemitsu Kosan Co., Ltd., molar ratio of 1,2-structure/1,4-structure=20/80, number average molecular weight (Mn)=2500 (determined by GPC using a polystyrene as a standard material), hydroxyl value=44.9 (KOH mg/g) and 202.4 g of ε-caprolactone were put into a separable flask with a capacity of 1 L, and then heated at 60° C. to obtain an uniform solution under a nitrogen atmosphere. 0.9 g of tin 2-ethylhexanoate (II) was added thereto, heated at 100° C., and then stirred at 100° C. for 7 hours. Thereafter, the resultant was left to cool for 12 hours. The resultant was dissolved in 548.1 g of tetrahydrofuran. The obtained solution was added dropwise into 4979 g of methanol vigorously stirred. After the completion of the adding dropwise, the resultant was stirred for 2 hours, and then left still for 12 hours. The supernatant was decanted off, and the precipitate was dissolved in 467.5 g of tetrahydrofuran. The volatile component was distilled off under reduced pressure using an evaporator to obtain a polymer polyol E.

The polymer polyol E had a number average molecular weight (Mn) of 9600, a weight-average molecular weight (Mw) of 14400, and a molecular weight distribution (Mw/Mn) of 1.51, and the mass ratio of polybutadiene component/polycaprolactone component ($Y/(X^1+X^2)$) was 60.8/39.2.

SYNTHESIS EXAMPLE 6

10.0 g of NISSO-PB G-1000 and 14.1 g of δ-valerolactone (manufactured by Tokyo Chemical Industry Co., Ltd.) were put into an eggplant flask with a capacity of 0.1 L, and then heated at 60° C. to obtain an uniform solution under a nitrogen atmosphere. 0.1 g of tin 2-ethylhexanoate (II) was added thereto, heated at 100° C., and then stirred at 100° C. for 7 hours. Thereafter, the resultant was left to cool for 12 hours. The resultant was dissolved in 37.2 g of tetrahydrofuran. The obtained solution was added dropwise into 1222 g of methanol vigorously stirred. After the completion of the adding dropwise, the resultant was stirred for 2 hours, and then left still for 12 hours. The supernatant was decanted off, and the precipitate was dissolved in 89.3 g of tetrahydrofuran. The volatile component was distilled off under reduced pressure using an evaporator to obtain a polymer polyol F.

The polymer polyol F had a number average molecular weight (Mn) of 7200, a weight-average molecular weight (Mw) of 9800, and a molecular weight distribution (Mw/Mn) of 1.36, and the mass ratio of polybutadiene component/polyvalerolactone component ($Y/(X^1+X^2)$) was 51.3/48.7.

(Preparation of Polyurethane)

EXAMPLE 1

125.1 g of the polymer polyol A was put into a separable flask with a capacity of 500 mL, and the pressure therein was reduced. Thereafter, stirring was conducted at 100° C. to remove the moisture content from the system. Then, nitrogen was introduced into the system to obtain an ordinary pressure, and the temperature was decreased to 80° C. 20.0 g of 2,4-tolylenediisocyanate (COSMONATE T-100, manufactured by Mitsui Chemicals, Inc., containing at least 98% of 2,4-tolylenediisocyanate) (R ratio=2.1) was added therein, and stirred at 80° C. for 1 hour. The reaction was progressed until the NCO content was within a range of its theoretical value (=3.5%)±0.5% to obtain a urethane prepolymer A.

The NCO content was determined, as follows. Approximately 3 g of the reaction liquid was put into a conical flask equipped with a stopper in which dry air was flown, to which 20 ml of toluene and 20 ml of a dibutylamine/toluene solution were added, and then the mixture was stirred for 15 minutes. Thereafter, 100 ml of 2-propanol and a few drops of a bromophenol blue indicator were added thereto, and titrimetric analysis was conducted using 0.5M of hydrochloric acid to determine the quantity of isocyanate (NCO) groups.

4.9 g of 1,4-butanediol (NCO index=1.05) was added to 142.1 g of the urethane prepolymer A at 80° C., and defoamed by stirring the mixture under reduced pressure for 10 minutes. Nitrogen was introduced into the system to return the pressure therein to ordinary pressure.

The resultant was immediately poured onto a glass plate pretreated with a release agent to obtain a thickness of 2 mm. The glass plate had silicon rubber walls having a thickness of 2 mm at edges of the glass plate. The resultant was heated at 100° C. for 2 hours, and then reacted at 110° C. for 15 hours. The obtained sheet was removed from the glass plate, and then was subjected to annealing treatment at 100° C. for 14 hours to obtain a polyurethane A. The appearance of the polyurethane A was light yellow and transparent.

EXAMPLE 2

A polyurethane B was obtained in the same way as that of Example 1, except that the polymer polyol B was used instead of the polymer polyol A. The appearance of the polyurethane B was light yellow and transparent.

EXAMPLE 3

A polyurethane C was obtained in the same way as that of Example 1, except that the polymer polyol C was used instead of the polymer polyol A. The appearance of the polyurethane C was light yellow and transparent.

EXAMPLE 4

A polyurethane D was obtained in the same way as that of Example 1, except that the polymer polyol D was used instead of the polymer polyol A. The appearance of the polyurethane D was light yellow and transparent.

EXAMPLE 5

A polyurethane E was obtained in the same way as that of Example 1, except that the polymer polyol E was used instead of the polymer polyol A. The polyurethane E had an orange color.

COMPARATIVE EXAMPLE 1

126.8 g of the polymer polyol B was put into a separable flask with a capacity of 500 mL, and the pressure therein was reduced. Thereafter, stirring was conducted at 100° C. to remove the moisture content from the system. Then, nitrogen was introduced into the system to obtain an ordinary pressure, and the temperature was decreased to 80° C. 20.4 g of diphenylmethane diisocyanate (MILLIONATE MT, manufactured by Nippon Polyurethane Kogyo Co., Ltd., containing at least 99% of 4,4'-diphenylmethane diisocyanate) was added thereto, and stirred at 80° C. for 1 hour. The reaction was progressed until the NCO content was within a range of its theoretical value (=2.4%)±0.5% to obtain a urethane prepolymer F.

When 1.9 g of 1,4-butanediol was added to 144.9 g of the urethane prepolymer F at 80° C., the thickness of the resultant was significantly increased, and the fluidity thereof was lost. The resultant was not a TPU suitable for practical use, due to the absence of the usable time.

COMPARATIVE EXAMPLE 2

47.5 g of the polymer polyol B was put into a separable flask with a capacity of 500 mL, and the pressure therein was reduced. Thereafter, stirring was conducted at 100° C. to remove the moisture content from the system. Then, nitrogen was introduced into the system to obtain an ordinary pressure, and the temperature was decreased to 60° C. 7.7 g of diphenylmethane diisocyanate (MILLIONATE MT, manufactured by Nippon Polyurethane Kogyo Co., Ltd., containing at least 99% of 4,4'-diphenylmethane diisocyanate) was added thereto, and stirred at 80° C. for 1 hour. The reaction was progressed until the NCO content was within a range of its theoretical value (=2.4%)±0.5% to obtain a urethane prepolymer G.

1.1 g of 1,4-butanediol was added to 53.9 g of the urethane prepolymer G at 50 to 60° C., and then defoamed by stirring the mixture under reduced pressure for 10 minutes. Nitrogen was introduced into the system to return the pressure therein to ordinary pressure.

The resultant was immediately poured onto a glass plate pretreated with a release agent to obtain a thickness of 2 mm. The glass plate had silicon rubber walls having a thickness of 2 mm at edges of the glass plate. The resultant was heated at 100° C. for 2 hours, and then reacted at 110° C. for 15 hours. The obtained sheet was removed from the glass plate, and then was subjected to annealing treatment at 100° C. for 14 hours to obtain a polyurethane G. The polyurethane G was very brittle.

EXAMPLE 6

125.1 g of the polymer polyol B was put into a separable flask with a capacity of 500 mL, and the pressure therein was reduced. Thereafter, stirring was conducted at 100° C. to remove the moisture content from the system. Then, nitrogen was introduced into the system to obtain an ordinary pressure, and the temperature was decreased to 80° C. 18.7 g of isophorone diisocyanate (under the trade name of VESTANET IPDI manufactured by EVONIK INDUSTRIES) (R ratio=2.1) was added thereto, and then stirred at 80° C. for 1 hour. The reaction was progressed until the NCO content was within a range of its theoretical value (=2.6%)±0.5% to obtain a urethane prepolymer H.

The NCO content was determined, as follows. Approximately 3 g of the reaction liquid was put into a conical flask equipped with a stopper in which dry air was flown, to which 20 ml of toluene and 20 ml of a dibutylamine/toluene solution were added, and then the mixture was stirred for 15 minutes. Thereafter, 100 ml of 2-propanol and a few drops of a bromophenol blue indicator were added thereto, and titrimetric analysis was conducted using 0.5M of hydrochloric acid to determine the quantity of isocyanate (NCO) groups.

3.6 g of 1,4-butanediol (NCO index=1.05) was added to 139.7 g of the urethane prepolymer H at 80° C., and defoamed by stirring the mixture under reduced pressure for 10 minutes. Nitrogen was introduced into the system to return the pressure therein to ordinary pressure.

The resultant was immediately poured onto a glass plate pretreated with a release agent to obtain a thickness of 2 mm. The glass plate had silicon rubber walls having a thickness of 2 mm at edges of the glass plate. The resultant was heated at 100° C. for 2 hours, and then reacted at 110° C. for 15 hours. The obtained sheet was removed from the glass plate, and then was subjected to annealing treatment at 100° C. for 14 hours to obtain a polyurethane H. The appearance of the polyurethane H was light yellow and transparent.

COMPARATIVE EXAMPLE 3

130.0 g of the polymer polyol B was put into a separable flask with a capacity of 500 mL, and the pressure therein was reduced. Thereafter, stirring was conducted at 100° C. to remove the moisture content from the system. Then, nitrogen was introduced into the system to obtain an ordinary pressure, and the temperature was decreased to 80° C. 14.9 g of m-xylylenediisocyanate (manufactured by Tokyo Chemical Industry Co., Ltd.) was added thereto, and stirred at 80° C. for 1 hour. The reaction was progressed until the NCO content was within a range of its theoretical value (=2.4%)±0.5% to obtain a urethane prepolymer I.

When 3.4 g of 1,4-butanediol was added to 143.8 g of the urethane prepolymer I at 80° C., the thickness of the resultant was significantly increased, and the fluidity thereof was lost. The resultant was not a TPU suitable for practical use, due to the absence of the usable time.

(Evaluation of Polyurethane)

The polyurethanes A to E, G, and H were subjected to the following hardness test, tension test, and water absorption test. The obtained results are shown in Table 1.

<Hardness Test>

The hardness was measured in accordance with JIS K 7311 by laminating 6 molded sheets, each having a thickness of 2 mm, and using A type or D type of an durometer.

<Tension Test>

Modulus at 100% elongation (M100), modulus at 200% elongation (M200), modulus at 300% elongation (M300), tensile strength (TB, stress at breaking), and breaking elongation (EB) were measured in accordance with JIS K 7312 by preparing No. 5 dumbbell test piece and using a testing machine (manufactured by Shimadzu Corporation under the trade name of AUTOGRAPH AGS-J (5 kN)).

<Water Absorption Test>

Each test piece having a size of 50 mm×50 mm×2 mm thickness was prepared and the mass $W_0$ thereof was measured. After the test piece was immersed in water at 23° C. for 24 hours, the test piece was pulled up to wipe off water from the surface thereof, and the mass $W_1$ thereof was measured. The ratio (water absorption ratio) of the increased mass $W_1-W_0$ during the immersion with reference to the mass $W_0$ before the immersion was calculated.

TABLE 1

| | Example 1 | Example 2 | Example 3 | Example 4 | Example 5 | Comparative Example 2 | Comparative Example 6 |
|---|---|---|---|---|---|---|---|
| Hardness A | 56 | 51 | 92 | 52 | 56 | 64 | 59 |
| Hardness D | 15 | 9 | 31 | 12 | 13 | 18 | 14 |
| M100 (MPa) | 1.4 | 1.0 | 4.1 | 1.0 | 1.3 | 2.0 | 1.3 |
| M200 (MPa) | 1.9 | 1.2 | 4.0 | 1.5 | 1.7 | — | 2.0 |
| M300 (MPa) | 2.6 | 1.3 | 4.3 | 1.8 | 2.0 | — | 3.3 |
| TB (MPa) | 7.3 | 10.9 | 14.9 | 7.9 | 2.2 | 2.6 | 6.7 |
| EB (%) | 435 | 877 | 706 | 595 | 215 | 111 | >600 |
| Water absorption ratio (%) | 0.44 | 0.69 | 0.35 | 0.35 | 0.35 | 0.59 | 0.7 |

As shown in Table 1, the polyurethane G prepared in Comparative Example 2 exhibited 111% of breaking elongation in the tension test, and M200 and M300 thereof could not be measured.

On the other hand, the polyurethanes A to E and H prepared in Examples 1 to 6 had favorable mechanical and physical properties and exhibited low water absorption ratio.

INDUSTRIAL APPLICABILITY

The polyurethane according to the present invention has favorable mechanical and physical properties and excellent water-resistant properties.

The invention claimed is:

1. A polyurethane obtained by reacting:
an unsymmetric diisocyanate, a chain extender, and a polymer polyol represented by formula (I):

$$HO-X^1-Y-X^2-OH \quad (I)$$

where:
$X^1$ and $X^2$ each independently represents a polyester component comprising at least one repeating unit represented by formula (II):

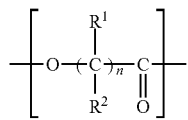 (II)

where $R^1$ and $R^2$ each independently represents a hydrogen atom or an alkyl group, and n represents an integer of 3 to 7, Y represents a polybutadiene component consisting of:
- a 1,4-structure consisting of a repeating unit represented by formula (IVb); and
- a 1,2-structure consisting of a repeating unit represented by formula (Vb):

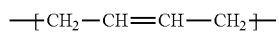 (IVb)

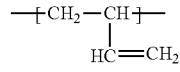 (Vb)

wherein a molar ratio of the 1,2-structure/the 1,4-structure is within a range from 90.4/9.6 to 95/5, and a ratio of a mass of Y with reference to a total mass of $X^1$ and $X^2$ in the polymer polyol is 0.3 to 3.5.

2. The polyurethane according to claim 1, wherein $R^1$ and $R^2$ each independently represents a hydrogen atom, and n is 5.

3. The polyurethane according to claim 1, wherein the chain extender is an aliphatic glycol.

* * * * *